United States Patent
Hyppänen et al.

(10) Patent No.: US 6,294,001 B1
(45) Date of Patent: Sep. 25, 2001

(54) APPARATUS AND A METHOD FOR SEPARATING PARTICLES FROM HOT GASES

(75) Inventors: Timo Hyppänen, Karhula; Jari Ristola, Kotka, both of (FI)

(73) Assignee: Foster Wheeler Energia Oy, Helsinki (FI)

( * ) Notice: Subject to any disclaimer, the term of this patent is extended or adjusted under 35 U.S.C. 154(b) by 0 days.

(21) Appl. No.: 09/308,339

(22) PCT Filed: Oct. 31, 1997

(86) PCT No.: PCT/FI97/00665

§ 371 Date: May 18, 1999

§ 102(e) Date: May 18, 1999

(87) PCT Pub. No.: WO98/22199

PCT Pub. Date: May 28, 1998

(30) Foreign Application Priority Data

Nov. 19, 1996 (FI) .......................................... 964615

(51) Int. Cl.$^7$ .............................. B01D 45/12; B04C 5/04; F23C 11/02

(52) U.S. Cl. .............................. 95/271; 55/385.1; 55/455; 55/459.1; 55/459.4; 422/147

(58) Field of Search ................... 55/385.1, 447, 55/455, 458, 459.1, 459.4, 461; 95/271; 110/216; 422/147, 139

(56) References Cited

U.S. PATENT DOCUMENTS

| | | | |
|---|---|---|---|
| 2,320,345 | * | 6/1943 | Blizard . |
| 3,358,844 | * | 12/1967 | Klein et al. . |
| 3,541,768 | | 11/1970 | Labadie .................. 55/419 |
| 3,744,220 | * | 7/1973 | Klein . |
| 4,028,076 | * | 6/1977 | Fields . |
| 4,854,249 | | 8/1989 | Khinkis et al. .............. 110/342 |
| 4,867,756 | | 9/1989 | Patel .......................... 48/197 R |
| 5,070,822 | | 12/1991 | Kinni et al. ................... 122/4 D |
| 5,116,394 | | 5/1992 | Garkawe ....................... 55/259 |
| 5,281,398 | | 1/1994 | Hyppanen et al. .............. 422/147 |
| 5,738,712 | * | 4/1998 | Hyppanen . |

FOREIGN PATENT DOCUMENTS

| | | |
|---|---|---|
| 41 32 660 | 4/1993 | (DE) . |
| 0 700 728 | 3/1996 | (EP) . |
| 86964 | 7/1992 | (FI) . |
| WO 96/28237 | 9/1996 | (WO) . |

* cited by examiner

*Primary Examiner*—David A. Simmons
*Assistant Examiner*—Fred Prince
(74) *Attorney, Agent, or Firm*—Fitzpatrick, Cella, Harper & Scinto

(57) ABSTRACT

An apparatus that includes (i) a centrifugal separator assembly and (ii) a fluidized bed reactor having a reactor chamber, the separator assembly being connected to the reactor and provided for separating solid particles from gas discharged from the reactor chamber. The apparatus includes planar peripheral walls defining a vortex chamber, having a rectangular cross section, the vortex chamber having an interior gas volume in which at least two vertical gas vortices can be formed, and the planar peripheral walls including a first wall portion connecting the separator assembly to the reactor chamber, at least two gas outlets, disposed one after the other in the longitudinal direction of the vortex chamber, for discharging cleaned gas from the gas volume, at least one solid particles outlet for discharging separated solid particles from the gas volume, and at least one gas inlet, arranged in the first wall portion, for introducing gas from the reactor chamber into the gas volume. The at least one gas inlet includes at least two inlet ducts which are mainly perpendicular to the first wall portion and arranged side-by-side in the first wall portion within a less than ninety degree sector of one gas vortex within the vortex chamber.

29 Claims, 3 Drawing Sheets

APPARATUS AND A METHOD FOR SEPARATING PARTICLES FROM HOT GASES

BACKGROUND OF THE INVENTION

The present invention relates to an apparatus and a method for separating particles from hot gases.

The present invention particularly relates to a centrifugal separator assembly, which may be connected to a reactor, such as a combustor or gasifier, for separating solid particles discharged with flue gases from its reactor chamber. The peripheral walls of the centrifugal separator's vortex chamber delimit an interior gas volume with at least one gas vortex therein. A first wall portion of the peripheral walls includes an inlet for introducing the flue gases and solid particles entrained therein into the vortex chamber. The vortex chamber further includes at least one gas outlet, for discharging purified gas therefrom, and at least one particles outlet, for discharging separated solid particles therefrom.

The present invention more particularly relates to centrifugal separator assemblies, which are suitable for separating solid particles from process or product gases in fluidized bex reactors, such as circulating fluidized bed reactors used for combustion or gasification of carbonaceous or other fuels.

Conventional centrifugal separators have cyclones delimited by cylindrical peripheral walls and a conical bottom. It has, however, recently been noticed that centrifugal separators can advantageously be made also of planar wall panels, the vortex chamber formed thereby having a non-circular horizontal cross section. U.S. Pat. No. 5,281,398 discloses this kind of a centrifugal separator, according to which particles entrained in hot gases are separated in a vortex chamber delimited by a plurality of substantially planar plates or panels, the vortex chamber having a polygonal, preferably quadrate, horizontal cross section. Such a separator has numerous especially cost saving advantages over conventional centrifugal separators, it is particularly easy to construct, even if made of water tube panels, and it may easily be integrated with reactor furnaces made of similar wall panels, thereby providing a compact overall design. Gas is introduced into the non-circular vortex chamber, through a gas inlet in the side wall thereof, so as to guide the gas as tangentially as possible into the gas vortex formed within the vortex chamber, in order to maximize the swirling or spinning of the gas in the gas vortex.

The advantages of introducing gas tangentially into the vortex chamber is well-known, also in conventional cylindrical cyclones. This advantage has also been noticed in U.S. Pat. No. 5,070,822 suggesting a centrifugal separator having its vortex chamber centrally located within the upper most part of a cylindrical furnace. The centrifugal separator comprises a plurality of wing-like elements arranged one after the other on the upper periphery of the vortex chamber. A plurality of spaced gas inlets is thus formed between the wing-like elements along the entire periphery of the vortex chamber. The wing-like elements, which may be made of a ceramic material, are directed so as to guide the plurality of gas flows through the inlets tangentially into a vortex formed centrally within the vortex chamber.

In a centrifugal separator with planar walls, as disclosed in earlier mentioned U.S. Pat. No. 5,281,398, the inlet to the separator is a vertical slot located so as to lead the gas flow and the solid particles therein as tangentially as possible towards the vertical gas vortex formed within the vortex chamber. A simple opening in a side wall of the vortex chamber does, however, have a rather poor guiding effect on the gas and solid particles flowing into the vortex chamber. A considerable portion of the gas and solid particles introduced through the opening immediately deviates from the intended tangential direction and meets the gas vortex at an angle substantially greater than zero. This to some extent decreases the swirling velocity of the gas vortex and lowers the separation efficiency of the system. Some of the solid particles may also, if not directed correctly, hit the walls of the vortex chamber at an unfavorable angle, thereby causing heavy erosion.

It has been suggested to insert vertical guide plates around the inlet opening in order to increase the horizontal directionality of the gas and solid particle stream, in order to force the gas and solid particles to flow into the vortex chamber in the intended direction. The guide plates form an inlet duct which has to be rather long, in order for the duct to have a real impact on the direction of movement of the gas and solid particle stream introduced into the vortex chamber.

The long guide plates or guiding walls are located within the vortex chamber for achieving the desired effect. Such inserts within a vortex chamber have, however, to be very well supported, insulated and protected in order to endure in the hot surroundings. Large extra constructions are heavy and have to be well supported and they also have to be connected firmly so as not to vibrate and decrease strength of the overall construction. To insert large elements, as suggested, into the vortex chamber goes against the general trend in the manufacturing of particle separators, which is to avoid the addition of any extra elements, which take space, have to be supported and protected. There is a need to make an as simple, straightforward and self-supporting construction as possible.

Further, it has been noticed in non-circular centrifugal separators, closely integrated with the reactor furnace, i.e., being connected by a common wall thereto, and having elements therein forming two or more gas vortices within the vortex chamber, that the strength of the common wall between the separator and the reactor furnace, especially the strength to withstand pressure differences between the furnace and the separator, is an important factor. The common wall tends to vibrate unless supported. It has, therefore, been suggested to dispose in the vortex chamber a partition or supporting wall, extending from the common wall to the opposite wall between two gas vortices, in order to increase the strength and suppress vibration. Such a supporting wall, however, also constitutes a rather large extra element within the vortex chamber, which preferably should be avoided.

Non-circular vortex chambers and reactor furnaces may also be built non-integrated, i.e., without a common wall, and mechanically connected to each other only through a distinct inlet duct. This prevents the pressure difference between the reactor chamber and the vortex chamber from directly having an impact on a wall in the vortex chamber. An inlet duct, if long enough, may further have a positive impact on directionality, i.e., it may help to lead the gas and solid particles tangentially into the gas vortex within the vortex chamber. The non-integrated construction requires, however, a lot of space and gives rise to a considerable increase in the costs.

There is obviously a need for new solutions, particularly in centrifugal separators with planar walls, to improve the directionality or orientation of the stream of gas and particles entering a centrifugal separator, i.e., to introduce the stream of gas and particles into the vortex chamber of the centrifugal separator without the stream being immediately spread or scattered, or without causing turbulence in the stream. The desire is to keep together the stream. This should, however, be done with inserts having a limited length, i.e., inserts which do not protrude so deep into the vortex chamber that they have a negative impact on the gas vortex therein. Such new solutions should preferably also be cost effective and able to improve the strength of the structure without requiring additional space in the vortex chamber.

SUMMARY OF THE INVENTION

The object of the present invention is to provide an improved centrifugal separator assembly and method of separating particles from hot gases.

It is a primary object of the present invention to provide an improved centrifugal separator with gas flow guiding means at the inlet for improving the swirling action of gas, within the vortex chamber.

It is thereby more particularly an object of the present invention to provide an improved centrifugal separator with guiding means of a limited length for providing an improved directionality of the gas and particle stream entering the separator.

It is also an object of the present invention to provide a modified centrifugal separator design with improved strength of the centrifugal separator structure.

It has now been noticed that the horizontal directionality of the stream of gas and solid particles being introduced into a vortex chamber may be increased not only by providing a long inlet duct, but by providing instead of one single inlet duct, two or more narrower and shorter inlet ducts within a certain sector of the vortex. The mere narrowing of one inlet duct increases—at a certain circulation rate—the forces and energy losses due to the increased pressure difference between the furnace and the cyclone. But by providing several narrow inlet ducts, the same open area may be maintained and an increase in pressure difference may be avoided. When utilizing several narrow inlet ducts instead of one single inlet duct, their length may be made correspondingly shorter, while still maintaining the same effect in orientation of the gas stream. Thus, it may be avoided that the inlet ducts have to be made longer than a so-called critical length $l_{critical}$ and penetrate so deep into the vortex chamber that they have an impact on the swirling vortex. The construction may also otherwise be simplified and made less heavy and costly.

Therefore, in order to fulfill the above and other objects, a centrifugal separator assembly connected to a reactor, such as a fluidized bed reactor, comprises according to the preferred embodiment of the present invention besides peripheral walls defining a vortex chamber and at least one gas outlet and at least one solid particles outlet, at least two inlet ducts arranged side by side in a wall, connecting the vortex chamber with the reactor, within a less than 90° sector of each of the at least one gas vortices formed within the vortex chamber.

The inlet ducts preferably have a length to width ratio l/w>0.8, the length l being the length of the inlet duct in the gas flow direction and the width w being the mean horizontal cross-sectional width of the inlet duct. The length to width ratio may in some exceptional cases be <0.8, particularly if the critical length of the inlet duct is very short. Also, the geometries of the inlet and outlet openings of the inlet ducts have an impact on the length to width ratio. The inlet and outlet openings may be chamfered if desired.

In a centrifugal separator, the two or more inlet ducts typically have identical widths, but may if desired have different widths. The width of single inlet ducts may also vary along their length. The inlet ducts may, e.g., be funnel-shaped, increasing or decreasing in the flow direction. The horizontal axes of the two or more separate inlet ducts may be parallel with each other or form an angle, preferably less than 30°, with each other.

The inlet ducts typically are vertical slots having parallel vertical side walls, the height h of a slot being at least twice, typically five times, the mean horizontal cross-sectional width of the slot.

The two or more inlet ducts may easily be formed according to the invention in an opening, prefabricated in a vortex chamber wall, by dividing the prefabricated opening with one or more vertical partition walls. Alternatively, inlet ducts may be prefabricated by casting in a prefabricated wall portion made of a castable material.

The present invention is particularly well suited to be applied in vortex chambers having cooled peripheral walls made of water or steam tubes forming a tube system, if desired connected to the main water/steam system of the reactor. In cooled walls, the tubes are mechanically connected side by side preferably by fins and in a vertical position. The one or more partition walls dividing the opening, for providing two or more inlet ducts according to the invention, may preferably be made of vertical tubes as well, the vertical tubes forming within the opening a partition wall perpendicular to the main plane of the peripheral wall. The tubes forming the partition wall are preferably connected to the tube system of the peripheral walls.

The one or more partition walls, dividing the opening into two or more inlet ducts, form a delimiting wall in each of two adjacent inlet ducts. The outermost delimiting wall of the inlet ducts, i.e., of the inlet ducts located adjacent to the vertical sides of the opening, may on the other hand be formed of tubes bent out of the main plane of the peripheral wall, when forming the opening.

The length of the inlet ducts, formed of partition walls or other inlet duct delimiting walls, should typically be greater than the thickness of the peripheral wall of the vortex chamber. Thereby, the one or more partition walls and/or the other delimiting walls used to form the inlet ducts protrude from the plane of the peripheral wall, preferably into the vortex chamber, but could protrude in the other direction if desired. The delimiting walls are typically formed of tube panels made of greater than three, preferably, greater than five tubes, mechanically connected side by side by fins.

The vortex chamber is according to a preferred embodiment of the present invention made of mainly planar peripheral walls and has a rectangular or square horizontal cross section, the peripheral walls of the vortex chamber comprising a common wall portion between the vortex chamber and the reactor chamber, said common wall portion including the first wall portion, first and second side walls, perpendicular to the common wall portion and a third side wall opposite to the common wall portion and parallel to the common wall portion, and the peripheral walls being formed of vertical tubes connected side by side, preferably by fins, and forming a peripheral wall tube system.

In an embodiment in which the vortex chamber has a square cross section, the gas outlet is disposed mainly in the middle of the top portion of the vortex chamber, and the inlet ducts are formed in an opening in the common wall portion adjacent to the first side wall. If desired, the inlet ducts may be located at the end of the common wall adjacent to the first side wall and perpendicular to the common wall. Then, a portion of the first side wall of the vortex chamber may form a side wall in one of the inlet ducts.

The vortex chamber has according to a most preferred embodiment of the present invention a rectangular cross section. Two gas outlets are then disposed one after the other in the longitudinal direction in the top portion of the vortex chamber, for providing two gas vortices within the gas volume in the vortex chamber. Inlet ducts are formed in an opening in the common wall portion between the two adjacent vortices. The inlet ducts are preferably formed in the common wall equidistant from the two vortices, for introducing gas into both of the two adjacent vortices. The delimiting walls of the inlet ducts are formed of one partition wall, disposed perpendicular to the main plane of the common wall portion, and of vertical tubes bent out of the plane of the common wall portion forming the outermost side walls in the inlet ducts.

The partition wall is formed of greater than three, preferably greater than five, vertical tubes mechanically connected side by side in a row. The tube construction of the partition wall is preferably covered by a layer of protecting refractory material, the thickness of the layer being chosen according to need. The refractory material may be shaped, e.g., streamlined, to provide advantageous flow properties in the inlet ducts and at their inlets and outlets.

The partition wall structure is especially useful in rectangular vortex chambers when it is constructed so that it also increases the strength of the common wall between a furnace and a centrifugal separator. The partition wall, dividing the opening, is typically mechanically connected to the common wall portion above and below the opening. A prolongation of the partition wall may additionally be mechanically connected to the lower part of a third side wall, opposite to the common side wall, of the vortex chamber, in order to increase the support of the common wall. The prolongation may on the other had alternatively or additionally be connected to supporting structures of the reactor chamber or the vortex chamber.

If desired, the first wall portion connecting the vortex chamber with the reactor chamber, may be made of a mainly homogeneous castable material. Then, the inlet ducts may be formed by casting.

These inlet ducts, which are formed by casting, may also have a length to width ratio l/w>0.8, as inlet ducts made in tube walls. The inlet ducts usually are parallel with each other and perpendicular to the main plane of the wall. The inlet ducts may, however, in some cases be made so as to form an angle less than 90° with the main plane of the wall. Then, also two single inlet ducts may be disposed to form an angle with each other, e.g., an angle of about 5° to 60°.

The present invention, as described above, provides an improved centrifugal separator with gas flow guiding means at the inlet thereof for improving the swirling action of gas within the vortex chamber. The improved swirling action is achieved with relatively short inlet ducts, which act as non-spreading nozzles. The nozzles form controlled pre-oriented gas jets, which introduce the gas in a desired direction and into a desired location within a limited space of the vortex chamber. The present invention thereby particularly provides a centrifugal separator in which the optimization of the directionality of gas and particles entering the separator is accomplished with a construction in which disturbance on the swirling action of the vortex is minimized.

Additionally, the present invention provides means for improving the strength of the centrifugal separator structure. The present invention particularly provides means for increasing the strength of the common side wall between the vortex chamber and the reactor.

BRIEF DESCRIPTION OF THE DRAWINGS

The above description, as well as further objects, features and advantages of the present invention will become more apparent from the following detailed description of the presently preferred, but nonetheless illustrative embodiments in accordance with the present invention when taken in conjunction with the accompanying drawings, wherein.

DETAILED DESCRIPTION OF THE INVENTION

Figure 1:
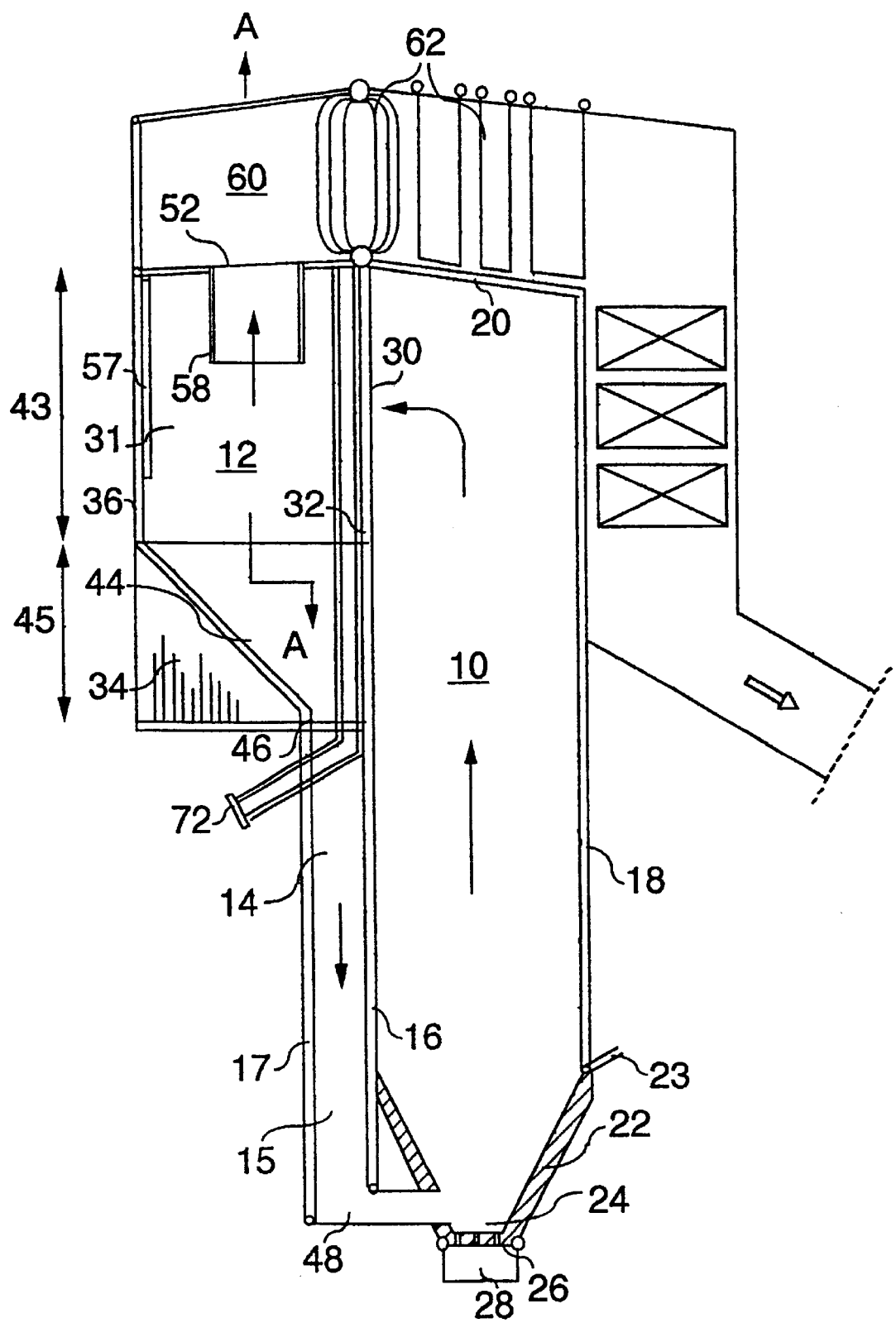
FIG. 1 is a schematic side view, partly sectional and partly elevated, of a circulating fluidized bed reactor with a centrifugal separator according to the present invention.

FIG. 1 illustrates a circulating fluidized bed reactor comprising a reactor chamber 10, a centrifugal particle separator (cyclone) 12 and a return duct 14 for returning separated particles back to the chamber 10. The cross section of the reactor chamber 10 is rectangular, as can be taken from FIG. 3. The reactor chamber 10 is made of water tube walls, only long walls 16 and 18 of which are shown in FIG. 1. The water tube walls are formed of vertical water tubes connected by fins in a manner known per se, e.g., as so-called membrane wall panels.

The upper part of wall 18 is bent to form a ceiling 20 of the reactor chamber 10. The walls in the lowermost section of the reactor chamber 10 are protected with refractory 22. One inlet 23 only, for solid material such as fuel, is shown, although there may be several different inlets. The bottom of reactor chamber 10 is formed of a distribution plate 24, which is equipped with nozzles or openings 26 for introducing fluidizing gas from an air plenum chamber 28 into reactor chamber 10 for maintaining a fluidized bed of solid particles therein. Fluidizing gas, e.g., air, is introduced into the reactor chamber 10 at such a high rate that it causes a substantial portion of the bed material to continuously flow together with the gas through the upper section of chamber 10 and through an inlet opening (e.g., slot) 30 disposed in the upper section of chamber 10 into particle separator 12.

The particle separator 12 is a multivortex centrifugal separator with a vortex chamber 12 with a gas volume having two parallel, vertical gas vortices formed therein, for separating particles from gas introduced from the reactor chamber 10 into the vortex chamber. The vortex chamber 12 defining the separator comprises planar, as can be seen in FIG. 3, primarily rectangular water tube side walls 32, 34, 36 and 38. These side walls 32, 34, 36, 38 are also made of joined, vertical water tubes 37 mechanically connected to each other by fins 39 (as shown in an elevated detail in FIG. 2). The vortex chamber 12 has according to FIG. 1 one long wall 32 in common with reactor chamber 10, i.e., a part of the wall 16 of reactor chamber 10 constitutes wall 32 of the vortex chamber. In some cases, distinct walls for both reactor chamber 10 and vortex chamber 12 may be used.

The upper parts of the side walls 32, 34, 36, 38 in the vortex chamber defining the gas volume are preferably vertical and planar and form an upper section 43. The lower part of the long wall 36, opposite to the common side wall 32, is bent towards the common wall for forming a funnel-shaped lower section 45 of the vortex chamber. By this structure, an asymmetric, long, slightly funnel-shaped gas volume 44 (see FIG. 1) is formed, the bottom part thereof forming a solids outlet 46.

Solids outlet 46 serves as an inlet into return duct 14. The long side walls of the return duct are formed by downward extensions of walls 32 and 36 of the particle separator 12. The end walls of the return duct 14 are correspondingly formed by downward extensions of the side walls 34 and 38. Only a portion of the ends walls 34 and 38, having a width of return duct 14, continues downwardly, thereby forming a return duct. The lower part of return duct 14 is in communication with the lower section of the reaction chamber 10 via an L-bend 48 for returning solids separated in separator 12 into the bottom of the reactor chamber 10; other types of solid flow seals may alternatively be used.

Figure 2:
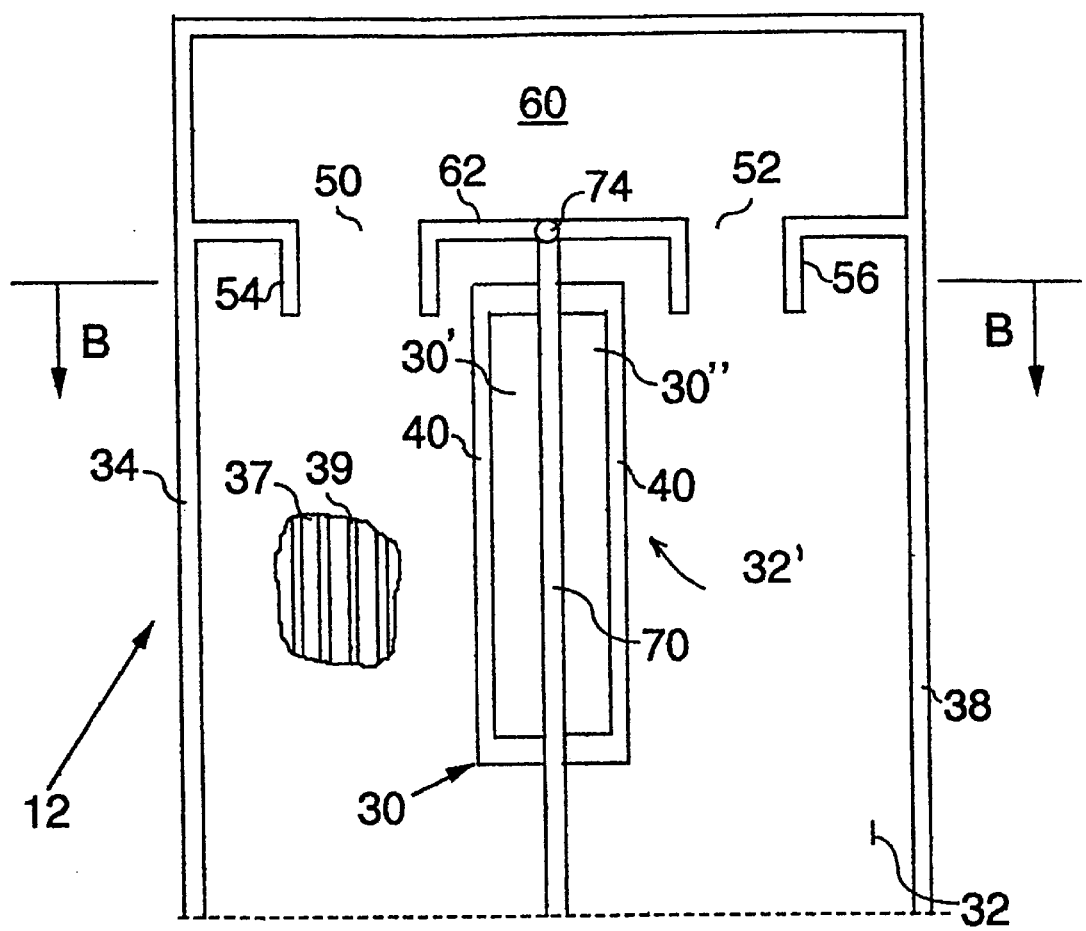
FIG. 2 is a cross-sectional view of the upper part of the centrifugal separator of FIG. 1 taken along line A—A thereof.
Figure 3:
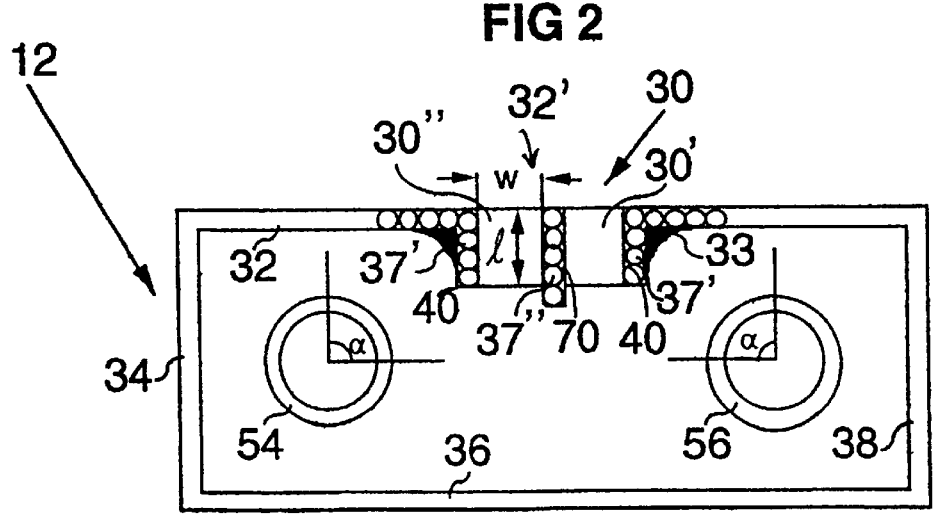
FIG. 3 is a cross-sectional view of the separator of FIG. 2 taken along lines B—B thereof.

In the upper section 43 of the vortex chamber, two successive gas outlet ducts 54 and 56, for the discharge of purified gas from the gas space of the vortex chamber 12 are disposed in openings 50 and 52, as shown in FIGS. 2 and 3. The gas outlet ducts 54, 56 in separator 12 may be made of heat resistant steel, be cooled or be made of ceramic material, in order to resist hot conditions in separator 12. The purified gases may be discharged in a manner known per se from the separator 12 through duct 60, passing heat recovery surfaces 62, and a convection section.

The side walls 32, 34, 36, 38 of the vortex chamber may be protected by a thin layer of heat and abrasion resistant refractory material, not shown in the drawings.

The inlet opening 30, formed in a first wall portion 32' in the common wall 32, is divided by a partition wall 70 to form two inlet ducts 30', 30", and is located within a 90° sector β of both gas vortices formed below gas outlets 54 and 56. The opening 30 is formed at the same distance from both vortices, between the vortices, approximately in the middle of the common wall 32 between chamber 10 and chamber 12.

At the vertical sides of the inlet opening 30, water tubes 37' of the water tube wall 32 are bent into the vortex chamber, as best seen in FIG. 3, so that the inlet delimiting vertical side walls 40, protruding into the vortex chamber, are formed. The side walls 40 are typically perpendicular to the main plane of wall 32, but could be inclined to form an angle greater than 60° with the main plane of wall 32. The side walls may be inclined so as to decrease the width of the inlet duct or so as to widen the inlet duct. A vertical partition wall 70, made of tubes 37", is disposed at the center of the slot-like opening 30, the partition wall dividing the opening in two similar inlet ducts 30' and 30". The partition wall is slightly longer than the side walls in the horizontal direction. The partition wall 70 and the walls 40 form the vertical delimiting walls for the two inlet ducts 30' and 30" formed in the opening.

The tubes 37" of the partition wall 70 are mechanically connected to wall 32 above and below the inlet ducts 30' and 30" and extend up to a header 74 at ceiling 62 of separator 12 and down to a header 72 below the lower part 45 of separator 12, as shown in FIGS. 1 and 2. The upper part of tubes 37" may if desired reach through duct 60 and be connected to a header arranged above or on the external side of the duct. At their lower part, the tubes 37" of partition wall 70 are bent out from the wall 32 and through the outer wall 17 of return duct 14, as shown in FIG. 1, and connected to a separate external header 72. If desired, the lower part of the tubes 37" may be bent out from the wall 32 already at a higher level than shown in FIG. 1, and may be made to protrude through the lower part of separator wall 36, thereby providing a stiffening mechanical connection between opposite walls 32, 36 in the separator. It may, on the other hand, not be necessary to bend the lower part of the tubes 37" at all if the tubes are connected at their lower part to a header located within or in connection with the return duct 14. Headers 74 and 72 may be supported (not shown in the drawings) so that the tubes 37" increase the strength of wall 32 and increase its ability to bear the pressure difference between furnace 10 and separator 12.

The inlet ducts delimiting walls 40 and the partition wall 70 define a width "w" of each of the two inlet ducts 30' and 30" formed in the opening 30. Delimiting sidewalls 40 and partition wall 70 extend inwardly from the common wall 32 between the reactor chamber 10 and the vortex chamber 12 into the vortex chamber a distance "l" which defines the length of the inlet ducts in the flow direction, e.g., a path length of the stream of gas and particles within slot 30' or 30". The ratio of inlet duct length to width l/w gives an indication of the horizontal directionality of the gas and solid particle stream flowing through the inlet duct. The larger the ratio the better the directionality. The ratio l/w is preferably greater than 0.8. At an inlet having two inlet ducts, the ratio may be about one, but may be even greater than one.

The partition walls are in most cases preferably made as thin as possible in order to keep the total width $w_{tot}$, i.e., the width of the first wall portion with the inlet ducts, as small as possible, in order to allow for the use of as long of inlet ducts as possible without the incoming gas stream interfering with the swirling motion of the gas vortex within the vortex chamber. The critical length of the inlet ducts, i.e., maximum length, of inlet ducts not interfering with the vortex, decreases as the shortest distance between the inlet end of the inlet duct and the vortex decreases. Therefore, inlet ducts should be located in the common wall portion as far away from the vortex as possible. This can be done by squeezing the inlet ducts into an as small a space as possible, i.e., by utilizing as thin of partition walls as possible.

In the embodiment shown in FIGS. 1–3, the directionality can be still improved by increasing the length l of walls 40 and 70, or by increasing the thickness of the refractory layer on wall 40 and/or wall 70 and thus, decreasing the width w of the inlet ducts. The total open area must, however, be maintained.

If desired, e.g., in order to provide more open area without having to increase the length of the inlet ducts, more than two inlet ducts may be formed. Then, two or more partition walls are used to divide the opening. Typically, the partition walls 70 and the delimiting side walls 40 are of different horizontal lengths, the partition wall being longer in the horizontal direction than the side walls. The walls could, of course, if desired, be of the same length, and the partition wall could even be shorter than the side walls. The partition wall 70 is usually made longer than the side walls in order to still increase its strengthening effect on the common wall 32.

At the external sides of the delimiting side walls 40, guiding means are provided, as generally shown by a reference number 33. The guiding means guide a gas vortex between the common wall 32 and sidewalls 40 so that the flow direction of particles separated from gas in the gas vortex is smoothly changed from generally along the interior of the first wall 32 to substantially perpendicular to the first wall 32 at the gas inlet 30 (i.e., substantially tangential to the gas vortex in the gas volume and along the stream introduced at slot 30).

Figure 4:
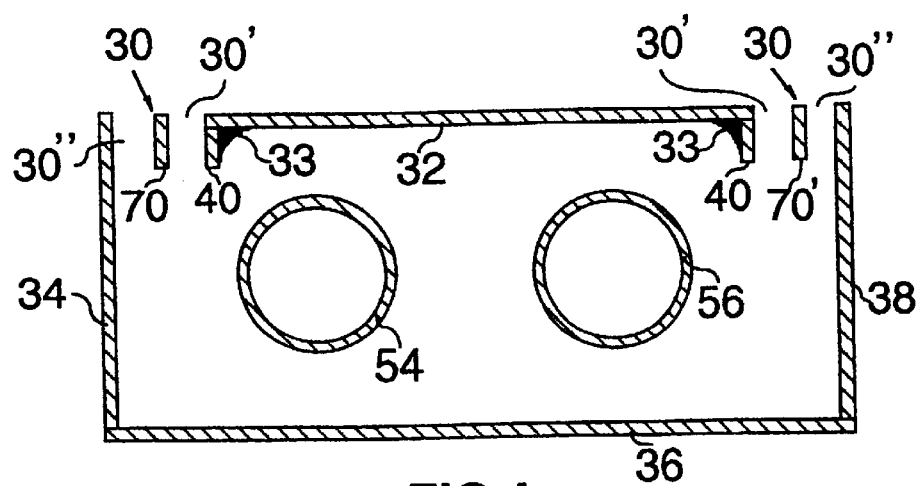
FIGS. 4–6 are views like that of FIG. 3 for alternative embodiments of centrifugal separators according to the present invention.
Figure 5:
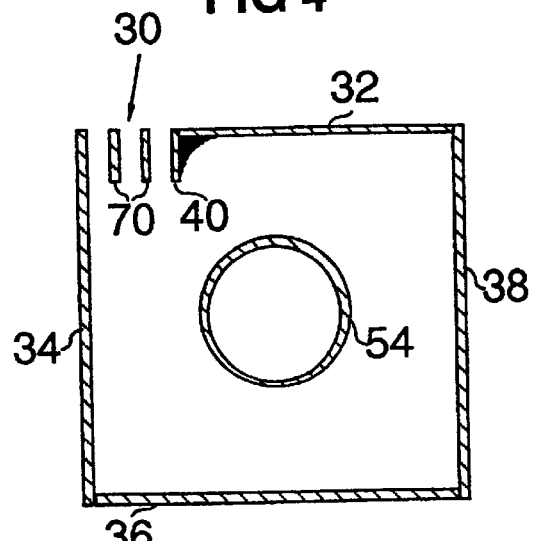
Figure 6:
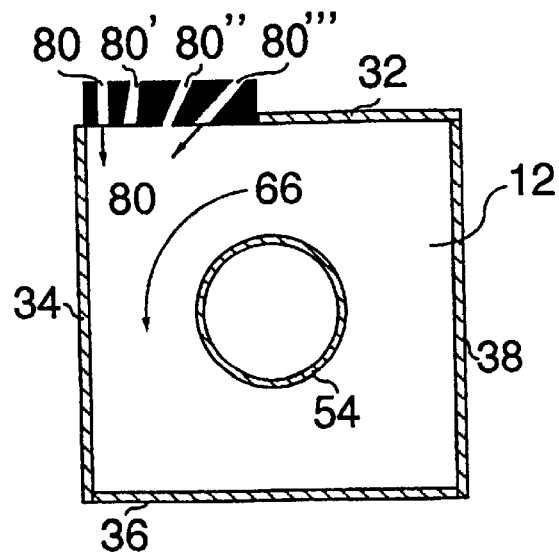

Instead of using the concept depicted in FIGS. 1–3, it may sometimes be preferable to use a double-vortex separator with two inlet openings, as shown in FIG. 4 or a one single vortex separator as shown in FIGS. 5 and 6.

In the embodiment depicted in FIG. 4, there are two inlet openings 30 in the separator. The openings are made in the ends of common wall 32 next to side walls 34 and 38, the side walls forming delimiting walls for the outermost inlet ducts 30". The partition walls 70 and 70' are disposed very close to walls 34 and 38 and do not essentially increase the strength of wall 32. Thus, the supporting of the upper and lower ends of the partition walls 70 and 70' is not as critical a factor as may be in the embodiment illustrated in FIGS. 1–3. Each of the two openings 30, each including two inlet ducts, is located in a 90° sector of one of the vortices, i.e., in a 90° sector of that particular vortex being closer to the inlet.

FIG. 5 shows a further alternative embodiment of the present invention. Three inlet ducts are formed in an inlet opening in a separator having a square horizontal cross section. A single vortex is formed in the vortex chamber. This embodiment illustrates the use of more than one partition wall 70 to provide more than two inlet ducts. Otherwise, this embodiment corresponds to that in FIG. 4.

FIG. 6 illustrates yet another embodiment of the present invention, wherein a single vortex is formed and the inlet ducts are constructed from slip casting mass. The advantage of using the casting technique is that it makes it possible to easily and with great accuracy form up to three to eight inlet ducts, even ducts of different forms and being disposed at different angles. The inlet ducts are all formed within a 90° sector of the vortex formed in the vortex chamber.

In the embodiment shown in FIG. 6, the first inlet duct 80 closest to the first side wall 34 is parallel with that side wall 34 and perpendicular to the side wall 32 connected to the reactor chamber. The next inlet duct 80' is not parallel with wall 34 but slightly inclined so as to guide the gas and solid particle flow therethrough toward the wall 34. Next inlet duct 80", further away from the side wall 34 is even more inclined and the last inlet duct 80'", most distant from side wall 34 is most inclined. The different inlet ducts introduce gas and solid particle jets tangentially toward the vortex formed in the vortex chamber, the jets, however, touching the vortex tangentially at different locations of the less than 90° sector. Thus, the different jets enhance the swirling motion of the vortex. The jets are formed so as to interact with vortex 66 as smoothly as possible.

The present invention provides an effective centrifugal separator and method of centrifugally separating particles particularly in polygonal multivortex separators, but can also be used to enhance swirling motion in cylindrical centrifugal separators. The present invention minimizes many of the drawbacks of prior art separators. The present invention particularly sets out to decrease the negative impact introduction of the gas and solid particle stream may have on the separation efficiency of the vortex. The swirling motion of the vortex may be improved with less space consuming inlet ducts than what has been suggested earlier. The present invention simultaneously provides an improvement to the construction of the centrifugal separator, the guiding elements not having to protrude very deep into the vortex chamber and the guiding elements (inlet duct considerations) adding to the strength and rigidity of the vortex chamber.

While the invention has been shown herein and described in what is presently believed to be the most practical, preferred embodiment thereof, it will be apparent to those of ordinary skill in the art that many modifications may be made thereof within the scope of the invention, which scope is to be interpreted broadly so as to encompass all equivalent structure and methods.

What is claimed is:

1. An apparatus comprising (i) a centrifugal separator assembly and (ii) a fluidized bed reactor having a reactor chamber, the separator assembly being connected to the reactor and provided for separating solid particles from gas discharged from the reactor chamber, said apparatus comprising:

planar peripheral walls defining a vortex chamber, having a rectangular cross section, said vortex chamber having an interior gas volume in which at least two vertical gas vortices can be formed, and said planar peripheral walls including a first wall portion connecting the separator assembly to the reactor chamber;

at least two gas outlets, disposed one after the other in the longitudinal direction of the vortex chamber, for discharging cleaned gas from the gas volume;

at least one solid particles outlet for discharging separated solid particles from the gas volume; and at least one gas inlet, arranged in the first wall portion, for introducing gas from the reactor chamber into the gas volume, said at least one gas inlet including at least two inlet ducts which are mainly perpendicular to the first wall portion and arranged side by side in the first wall portion within a less than ninety degree sector of one gas vortex within the vortex chamber.

2. An apparatus according to claim 1, wherein the inlet ducts have a length to width ratio l/w>0.8, the length l being the length of the inlet duct in the gas flow direction and the width w being the mean horizontal cross-sectional width of the inlet duct.

3. An apparatus according to claim 1, wherein the inlet ducts are vertical slots having parallel vertical inlet duct delimiting walls, the vertical height h of a slot being at least twice the mean horizontal cross-sectional width of the slot.

4. An apparatus according to claim 3, wherein the vertical height h of a slot is ten times the mean horizontal cross-sectional width of the slot.

5. An apparatus according to claim 1, wherein the at least two inlet ducts are formed in an opening in the first wall portion by dividing the opening with at least one vertical partition wall.

6. An apparatus according to claim 5, wherein the peripheral walls of the vortex chamber are tube walls, made of a plurality of vertical tubes connected to form a tube system, and the at least one partition wall dividing the opening is made of greater than three vertical tubes connected to said tube system.

7. An apparatus according to claim 6, wherein the at least one partition wall dividing the opening is made of greater than five vertical tubes connected to said tube system.

8. An apparatus according to claim 6, wherein the at least one partition wall is disposed within the opening mainly perpendicular to the main plane of the first wall portion.

9. An apparatus according to claim 6, wherein a vertical inlet duct delimiting side wall in the at least one of the inlet ducts is formed of vertical tubes bent out of the plane of the first wall portion, the tubes being bent into or out of the vortex chamber to form an inlet duct delimiting side wall perpendicular to the main plane of the first wall portion.

10. An apparatus according to claim 9, wherein the vertical inlet duct delimiting side wall is made of greater than three tubes, which are connected to the tube system of the peripheral walls.

11. An apparatus according to claim 10, wherein the vertical inlet duct delimiting side wall is made of greater than five tubes, which are connected to the tube system of the peripheral walls.

12. An apparatus according to claim 1, wherein the vortex chamber comprises:
  a common wall portion between the vortex chamber and the reactor chamber, said common wall portion including the first wall portion;
  a first side wall and a second side wall, perpendicular to the common wall portion; and
  a third side wall opposite to and at least in its upper part parallel to the common wall portion,
  wherein the peripheral walls are formed of vertical tubes mechanically connected side by side and forming a peripheral wall tube system.

13. An apparatus according to claim 12, wherein the peripheral walls are mechanically connected side by side by fins.

14. An apparatus according to claim 12, wherein the inlet ducts are formed in an opening in the common wall portion between two adjacent vortices, for introducing gas into both of the two adjacent vortices.

15. An apparatus according to claim 14, wherein the vertical delimiting walls of the inlet ducts are formed of at least one partition wall, disposed perpendicular to the main plane of the common wall portion and formed of vertical tubes connected to the peripheral wall tube system, and vertical tubes bent out of the plane of the common wall portion, the tubes being bent into or out of the vortex chamber to form an inlet duct delimiting side wall, inclined greater than sixty degrees to the main plane of the common wall portion.

16. An apparatus according to claim 15, wherein the inlet duct delimiting side wall is perpendicular to the main plane of the common wall portion.

17. An apparatus according to claim 14, further comprising two gas outlets disposed within the vortex chamber, for forming two gas vortices therein, one vertical opening formed in the middle of the common wall portion, and two inlet ducts formed in the opening by (i) disposing a vertical partition wall in the middle of the opening, for forming a first inlet duct delimiting wall in each of the two inlet ducts, and (ii) bending vertical tubes at the opening area out of the plane of the common wall portion, for forming a second inlet duct delimiting wall in each of the two inlet ducts.

18. An apparatus according to claim 14, wherein greater than three vertical tubes are bent out of the plane of the common wall portion.

19. An apparatus according to claim 18, wherein the vertical tubes bent out of the plane of the common wall portion are used for forming the vertical delimiting side walls of the inlet ducts.

20. An apparatus according to claim 14, wherein greater than five vertical tubes are bent out of the plane of the common wall portion.

21. An apparatus according to claim 20, wherein the vertical tubes bent out of the plane of the common wall portion are used for forming the vertical delimiting side walls of the inlet ducts.

22. An apparatus according to claim 14, wherein the partition wall is mechanically connected to the common wall portion above and/or below the inlet ducts and additionally by its prolongation to the lower part of the third side wall of the vortex chamber.

23. An apparatus according to claim 14, wherein the partition wall is mechanically connected to the common wall portion above and/or below the inlet ducts and additionally by its prolongation to supporting structures of one of the reactor chamber and the vortex chamber.

24. An apparatus according to claim 1, wherein the first wall portion is made of a mainly homogeneous castable material and the inlet ducts are formed by casting in the castable material.

25. An apparatus according to claim 24, wherein the inlet ducts have a length to width ratio l/w>0.8, the length l being the length of the inlet duct in the gas flow direction and the width w being the mean horizontal cross-sectional width of the inlet duct.

26. An apparatus according to claim 24, wherein the axes of the inlet ducts are parallel.

27. An apparatus according to claim 24, wherein the axes of at least two inlet ducts form an angle between 5° to 60°.

28. A method for separating solid particles from gas discharged from a reactor chamber, utilizing a centrifugal separator that includes a vortex chamber having a rectangular cross section and being delimited by peripheral walls including a planar first wall portion and having at least two gas outlets, at least one solid particles outlet and a gas inlet means arranged in the first wall portion, the method comprising:
  discharging a gas and solid particle stream from the reactor chamber and introducing the stream through the gas inlet means into the vortex chamber;
  separating solid particles from the gas in at least two gas vortices formed in the vortex chamber;
  discharging separated solid particles from the vortex chamber through the at least one solid particles outlet;
  discharging purified gas through the at least two gas outlets; and
  dividing the gas and solid particle stream discharged from the reactor chamber in the gas inlet means into at least two adjacent streams and introducing the at least two streams mainly perpendicular to the first wall portion and within a less than ninety degree sector of a gas vortex into the vortex chamber.

29. A method according to claim 28, further comprising guiding the at lest two gas and solid particle streams through inlet ducts having a length to width ratio l/w>0.8.

* * * * *